July 13, 1965 M. KNOBEL 3,194,055
WORK DIMENSION AND POSITION DETECTING, INDICATING
AND CONTROLLING METHOD AND APPARATUS
Filed May 6, 1963 2 Sheets-Sheet 1

INVENTOR.
MAX KNOBEL
BY
Blair & Buckles
ATTORNEYS

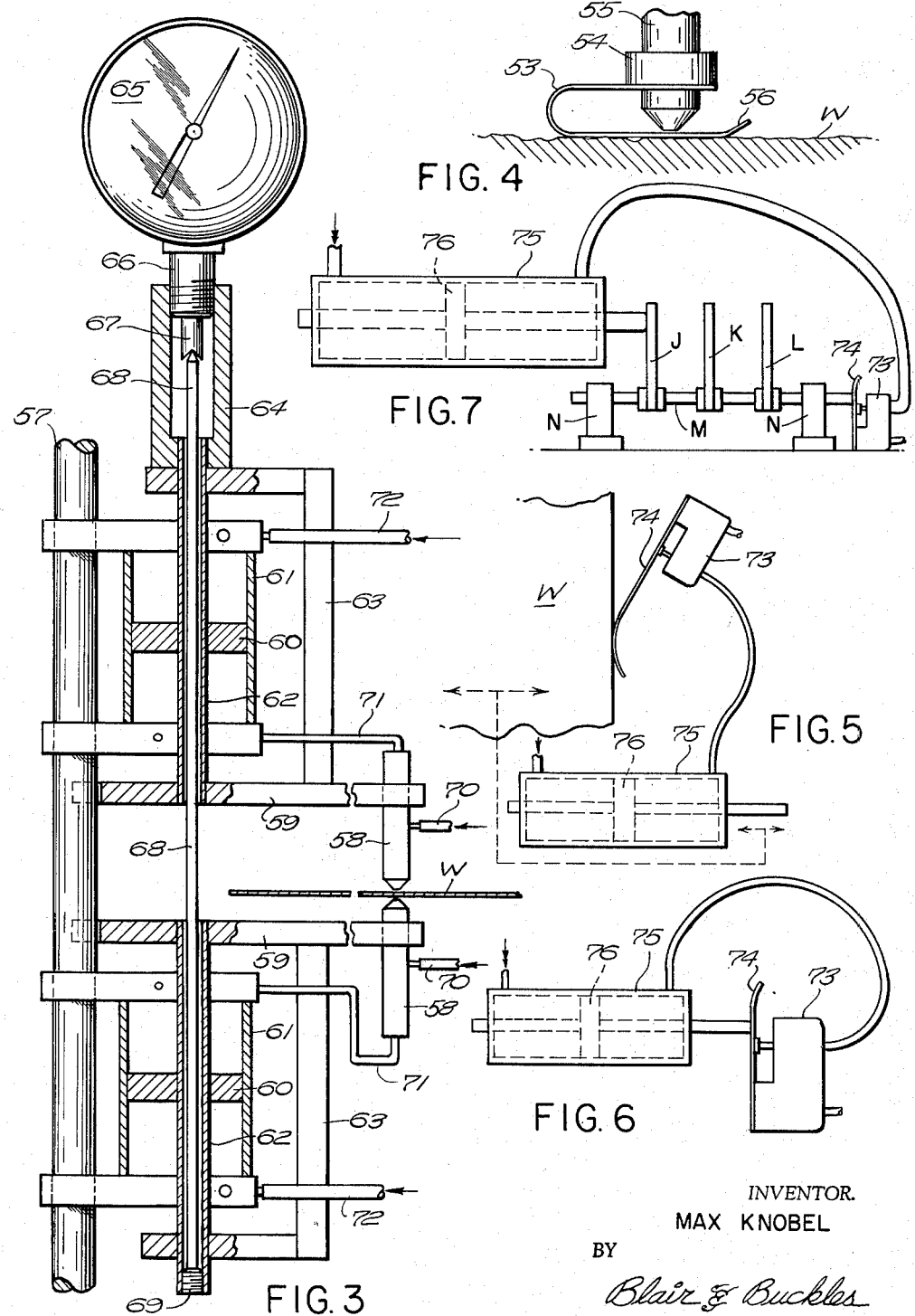

United States Patent Office 3,194,055
Patented July 13, 1965

3,194,055
WORK DIMENSION AND POSITION DETECTING, INDICATING AND CONTROLLING METHOD AND APPARATUS
Max Knobel, 663 Beacon St., Boston, Mass.
Filed May 6, 1963, Ser. No. 278,379
8 Claims. (Cl. 73—37.5)

My present invention relates to apparatus for determining critical dimensions and positions of parts and surfaces as for checking thickness, length, flatness, concentricity, inner or outer diameters, hole areas, and various other critical dimensions. It has important application for example in checking variation in thickness or position of travelling webs, sheets, strips and the like. In its broadest sense it may be denominated a pneumatic servomechanism.

In certain important aspects the invention improves upon thickness gaging apparatus such as that of my United States Patent No. 2,982,124 of May 2, 1961, as will appear from the following drawings and description.

In the drawings illustrating by way of example certain embodiments of the present invention:

Figures 1, 2:
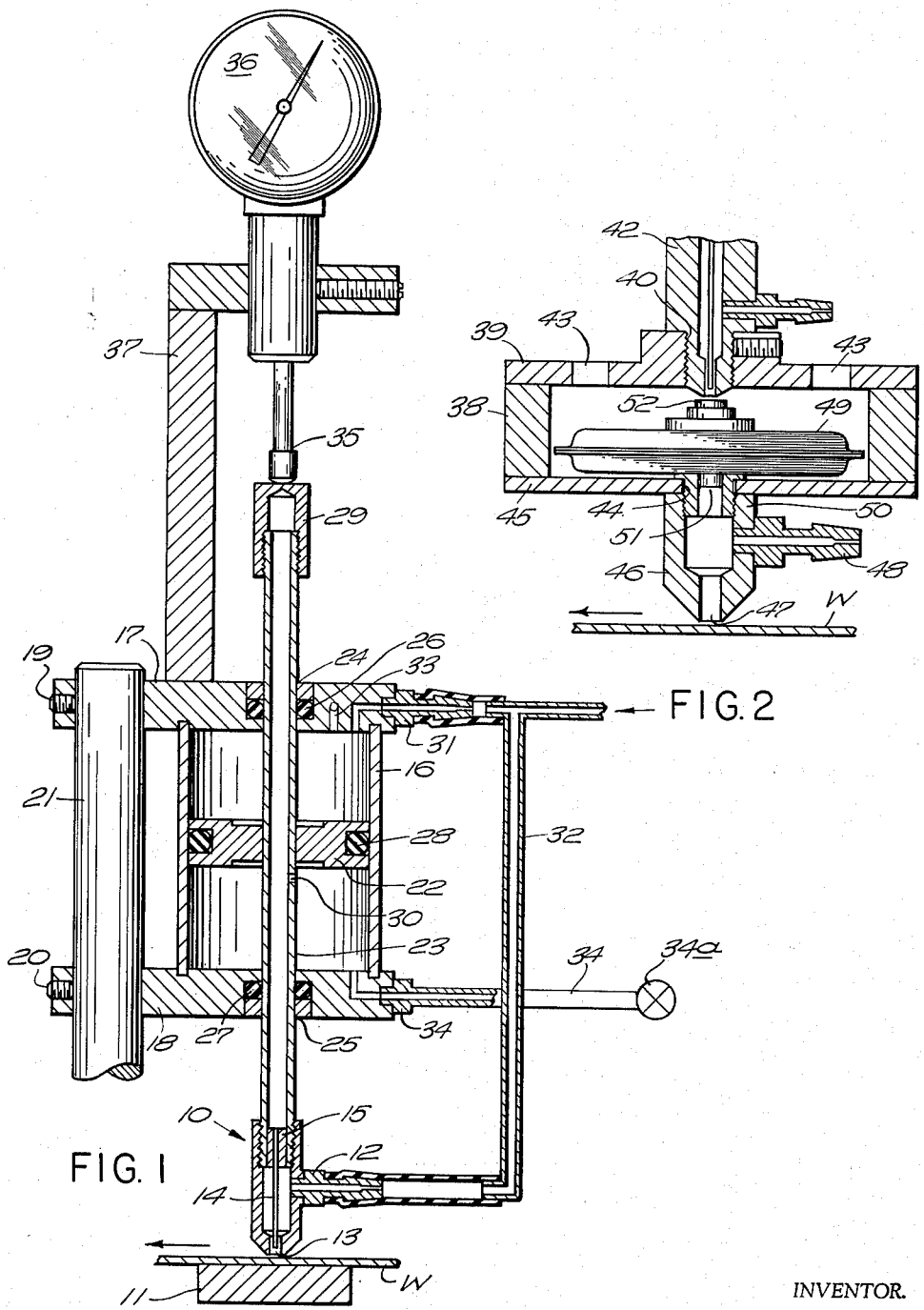
FIG. 1 is a partly schematic vertical sectional view of one embodiment of my invention, sometimes herein referred to as a whole as a follower, an element shown as an air nozzle following with reference to a travelling work surface for measurement thereof.
FIG. 2 is a similar view upon a larger scale illustrating an auxiliary element or booster relay useful in conjunction with a device such as that of FIG. 1.

FIG. 3, corresponding generally to FIG. 1, shows another embodiment comprising a differential follower operative at opposite faces of a travelling sheet to be measured or positionally controlled;

FIG. 4 is a detail view of an accessory means useful in conjunction with porous and other irregular surfaces to be measured;

FIG. 5 illustrates largely diagrammatically an application of the means of the invention to the positional control of a moving sheet;

FIG. 6 similarly illustrates the follower device functioning as a limit control; and FIG. 7, corresponding generally to FIG. 6, illustrates an application providing for a limit control with multiple stopping points.

As mentioned, the overall object of this invention is to furnish apparatus which will indicate the dimensions or position of object or work surfaces. To avoid physical contact between the indicator and the work, apparatus of the type with which this invention is concerned utilizes an air nozzle located adjacent the work which senses by means of work-responsive back pressure the distance between the nozzle and the work as well as changes in said distance caused by certain changes in the condition of the work such as, for example, ripples in the work surface facing the nozzle or positional variations with respect to the nozzle of the work itself. The back pressure at the nozzle accurately responds to these condition changes and may be used to actuate pneumatic means mechanically connected to a gage for affording direct reading of the condition or condition change or to operate other mechanism for effecting such indication and/or compensation for the condition change.

For increased range and accuracy, these devices commonly employ a nozzle which is caused to follow the work. That is, the back pressure at the nozzle reflecting the distance between the nozzle and the work is fed to a pneumatic cylinder containing a piston connected to the nozzle which shifts the nozzle from a mean position of reference to match the positional variations of the work thereby to maintain the nozzle at a substantially constant distance from the work. The detecting nozzle or piston movements may then be utilized as aforesaid to actuate an indicator gage or in association with mechanism to compensate for the changes in the condition of the work.

While prior dimension and position indicating devices are satisfactory up to a point, their accuracy and range are quite limited and they are not able successfully to indicate very small as well as large dimension or position changes. One reason for this is that they rely on springs or similar mechanical biasing means to oppose the back pressure at the nozzle and balance the indicator in its mean position. As a result of the air mass and spring produced forces being in opposition thusly, the prior devices tend to oscillate or hunt as they attempt to maintain the desired distance between the nozzle and the work. Further, this back pressure opposing balancing force afforded by the aforementioned spring or mechanical biasing means is not constant but varies over the range of indication thereby introducing error into the apparatus, which error increases over and limits the range of the apparatus, and in the case of indicators of the work follower type may cause the nozzle to follow at a non-uniform distance from the work.

The efficiency of these devices has suffered also because the balancing force opposing the nozzle back pressure is completely independent of the back pressure with the result that fluctuations in the nozzle supply pressure give rise to false indications of changes in the condition of the work.

My invention improves the art of dimension and position determination and indicating through use of apparatus in which the balancing force opposing the nozzle back pressure is pneumatic and remains constantly related to the air pressure at the nozzle over the entire range of detection and indication, whereby there is obtained an accurate measurement of the pertinent surface or work, with maintenance of a work-following nozzle at a constant distance from the work under even large or radical changes in the characteristics that are being observed, and despite fluctuations in the pressure of the air supplied to the nozzle. The invention enables and includes provision when desired for checking the condition even of porous or rough work such as travelling netted, pebbled or creped webs and for response to relative change in condition of two opposite work surfaces. Especially this invention while extending the range and accuracy of performance seeks to provide for the stated purposes apparatus which is simple and inexpensive to manufacture, easy to install and operate, and at the same time is rugged and of long useful life.

Referring to the drawings, FIG. 1 shows apparatus embodying the features of my invention and used as a follower to indicate the thickness of or proximity to a gaging nozzle of a travelling sheet or web. The follower apparatus comprises a nozzle indicated generally at 10 spaced adjacent to work W which here is a travelling web running over a flat bearing surface 11. Most preferably nozzle 10 is of the extended range type disclosed in my Patent No. 2,692,498, dated October 26, 1954, entitled "Air Gauge," and having an air inlet 12, gage orifice 13, tube 14 and plug 15. While a fuller description of the operation of the nozzle may be obtained from the aforementioned patent, in general air under pressure supplied to inlet 12 exhausts through orifice 13 against the work W developing a work-reflected back pressure in tube 14 which varies inversely as the distance between nozzle 10 and the work W. Such back pressure is communicated by suitable means to other parts of the apparatus to be described.

Means is provided for causing nozzle 10 to follow or float at a uniform distance from work W, assumed in this example as travelling over bearing surface 11. It will be understood that in the exploratory presentation of the follower to the work the relative bodily travel as between them may involve movement of the work, or of the follower bodily, or both. As shown in FIG. 1 such means comprises a pneumatic cylinder 16 having its upper and lower ends closed by manifolds 17, 18, respectively, secured at 19, 20 to a standard 21 suitable for supporting the entire apparatus. A piston 22 is provided within the cylinder 16 and slidable intermediate the ends thereof. Piston 22 is fitted with an elongated, hollow, open-ended piston rod or stem 23 fixed to it and extending lengthwise within the cylinder and projecting through openings 24, 25 in manifolds 17, 18 respectively. Suitable O-ring seals 26, 27, 28 are recessed into the upper and lower manifolds adjacent the openings 24, 25 and into the side wall of piston 22 respectively to preserve a substantially fluid-tight sliding fit, with low but some attendant friction for damping purposes, between the piston and rod assembly and the pneumatic cylinder with its manifolds. Possibility of error from oscillation of the piston about a mean position, or in the nature of hysteresis, is reduced to the negligible. Tests of embodiments of followers of the invention have shown piston positional variation due to hysteresis, for the given operative conditions, of less than .000,005″. Force on the piston is substantial; for example, with a piston of 1″ diam. or .7″ sq. face area under 15 p.s.i. air pressure the force is about 10 lbs. This is large relative to the friction force.

The lower end of piston rod 23 is adapted to snugly receive the plug 15 of nozzle 10 and is exteriorly threaded to accommodate the correspondingly interiorly threaded upper portion of nozzle 10. The upper end of piston rod 23, on the other hand, is sealed off by a cap 29. Thus the aforementioned back pressure produced in tube 14 of nozzle 10 is effectively communicated to the interior of piston rod 23 and thence through a passage 30 in the rod wall, at a point below piston 22, preferably close to it substantially as shown, to the interior of one chamber of cylinder 16, herein the lower chamber proximate to nozzle 10, in which chamber it acts on the piston 22.

Under the invention, air under pressure is introduced into the other or upper cylinder chamber to provide a counterforce to the force due to nozzle back pressure for balancing the piston 23 and thereby "floating" the nozzle 10 at a uniform distance from the work W. Most desirably this air should come from the same source as the air supplied to nozzle 10. Accordingly an air inlet 31 communicating with the upper cylinder chamber is provided in the upper manifold for example. The inlet 31 is connected as by means of a flexible conduit or hose 32 to inlet 12 of nozzle 10 and to an air supply (not shown) delivering air at a relatively high pressure, say about 30 p.s.i. The bore of inlet 31 is predeterminedly restricted or otherwise regulated so as to feed air into the upper chamber at a pressure preferably midway between the pressure extremes to be found in the lower chamber due to nozzle back pressure, or in other words at approximately 15 p.s.i. The upper manifold 17 is provided also with an air outlet 33 having a bore approximately the same size as that of inlet 31 so that a static pressure of about 15 p.s.i. is maintained in the upper cylinder chamber, which pressure is seen to offset the back pressure communicated to the lower cylinder chamber and to balance the piston 23 when nozzle 10 is spaced the desired distance from work W. The gap between the nozzle and the work is determined by the sensitivity of the nozzle. With a sensitive nozzle the gap is small and the overall accuracy of following is high; larger gaps of .003″ to .005″ are obtained by a less sensitive nozzle with some loss of accuracy of following.

Changes in the condition of the work such as, for example, an increase or decrease in work thickness are accompanied by corresponding instantaneous changes in the work-reflected back pressure communicated to the lower cylinder chamber causing the piston 22 and nozzle 10 to shift up or down accordingly until the pressure in the lower chamber again equals that in the upper chamber, herein 15 p.s.i., thereby maintaining a constant or uniform distance between the nozzle 10 and the work W. The movements of the piston rod 23 then accurately reflect the condition changes and may be used to actuate mechanism for gaging and when desired for correcting or compensating for the condition changes. Thus in the exemplary apparatus of FIG. 1, the cap 29 on the upper end of piston rod 23 is caused to bear against and actuate the push rod 35 of a standard dial type gage 36 adjustably mounted in the start leg of an L-shaped bracket 37 secured to the top of manifold 17. The gage 36 is positioned directly over piston rod 23 so that it causes no sliding inhibiting torque forces to act on the piston assembly, and the face of the gage may be scaled and calibrated to present the desired work-related information, such as a direct reading of the work or web thickness, readings of deviation from a standard thickness or work position, and the like.

It will be appreciated from the foregoing that a drop in supply pressure affects the air pressure in the upper and lower chambers of cylinder 16 substantially equally and that normally the position of piston 22 within cylinder 16 remains, independent of the pressure of the air within the chambers. Resultantly over the entire range of indication, the forces affecting the nozzle movements remain constantly proportioned to the air supplied to the nozzle and the range of nozzle movement is limited only by the length of the pneumatic cylinder 16. Hunting or oscillatory movements of the nozzle are substantially reduced and even such small oscillations as might tend to occur are damped by the sliding inhibiting O-ring seals 26, 27, 28.

In accordance with the invention, means are provided for quickly retracting the nozzle 10 from work W. This is accomplished by introducing into the lower chamber air under the full line pressure of 30 p.s.i. and for this an air inlet 34 is provided in lower manifold 18 which is connected through an air valve 34a to the air supply (not shown). Thus by opening valve 34a the air at 30 p.s.i. greatly exceeding the pressure of the air in the upper chamber flows into the lower chamber, forces piston 22 up and thereby raises nozzle 10.

In some commercial applications for decreased sensitivity it is desirable to maintain a very large gap, in the order of $\frac{1}{32}$ inch, between the gaging nozzle and the work. This of course reduces the pressure of the air exhausting against the work so that changes in the work-reflected back pressure may be extremely small and may be insufficient even to move the piston as above considered with reference to FIG. 1. Increasing the air supply pressure does not solve the problem because this requires much heavier air hoses and fittings which have been found to materially impede the movements of the nozzle. Accordingly I provide an air pressure amplifier or booster for use in conjunction with my indicating apparatus. The pressure booster is adapted to be installed on the gaging nozzle, such as that of FIG. 1, operatively between it and the work or positioning to be followed. As shown by way of example in FIG. 2 such booster or relay comprises a generally cylindrical housing 38 having a top wall 39 provided with a vertical threaded passage 40 for receiving the correspondingly threaded end of a gaging nozzle 42, e.g. comparable to nozzle unit 10 of FIG. 1. Top wall 39 has also air vent openings 43 to provide egress for the air exhausting through nozzle 42. A second passage 44 is formed in the bottom wall 45 of housing 38 directly below passage 40, and a second gaging nozzle 46 is mounted on the bottom wall 45 of housing 38 in line with said passage 44 and extending down to a point appropriately above work W. The nozzle 46 has a relatively large gaging orifice 47 in the order of ¼ inch diameter and is fitted with an air inlet 48 adapted to be connected to a suitable high pressure air supply (not shown) and which may be the same as for the first-mentioned gage nozzle 42 and associated follower elements as of FIG. 1.

Referring still to FIG. 2, a large pressure-responsive capsule or bellows means 49 is mounted within the housing and has a depending tubular stem 50 exteriorly threaded for reception in a correspondingly interiorly threaded upper portion of the nozzle 46. Such pressure-responsive means 49 further has an input air passage or tube 51 extending downwardly with a fluid-tight fit in the tubular stem 50, and also has driven member 52 mounted on the wall of bellows 49 opposite tube 51 and extending upwardly to a point just below the nozzle 42. The construction and arrangement of the bellows means 49 is such that a small pressure of even only a few inches of water introduced into the bellows through input passage 51 causes considerable expansion of bellows 49 with consequent relatively large movement of the driven member 52 toward nozzle 42. Thus, even slight changes in air pressure at nozzle 46 caused by correspondingly small changes in the back pressure produced within nozzle 46 as a result of variations in web thickness or other condition change are communicated into the bellows 49 and cause relatively large movements of the driven member 52 toward or away from the nozzle 42. The upper nozzle 42 functions then in much the same manner as that described in connection with the apparatus of FIG. 1, with the back pressure produced at nozzle 42 varying inversely as the distance between nozzle 42 and driven member 52 and so also as the distance between nozzle 46 and work W.

For many use applications my follower apparatus, such as in the FIG. 1 example, may be employed with the gaging nozzle exhausting directly against the work or test surface and the invention so contemplates. However, when the work composition or surface structure is such as to have insufficient or no capacity to produce appreciable characteristic or satisfactorily responsive work-reflected back pressure, for example if it consists of irregular surfaced or porous sheet material, or highly compressible or tenuous masses, such mode of direct-impinging operation may be unsatisfactory if not impossible. Accordingly I provide an auxiliary element for use in conjunction with my apparatus for enabling it to function effectively with respect to the objective dimensional or positional condition of even such materials as last above mentioned. This auxiliary element is disclosed in FIG. 4 as a generally U-shaped skid member 53 constructed of resilient material such as spring steel, for example, and having one leg affixed to a collar 54 adapted to fit snugly about the lower end of a gaging nozzle 55. The other or free leg of the skid member 53 is turned under the gaging orifice between the nozzle and the work W, and preferably has an upturned end 56 for facilitating the free running of the skid member over the work. Skid member 53 is so constructed and arranged that said orifice-opposed leg is biased away from the nozzle orifice and against the work. Resultantly as the dimension or position of the test work with respect to the nozzle changes, the skid means 53 follows toward or away from the nozzle orifice causing an increase or decrease in the work-controlled back pressure and a corresponding gaging shift of the nozzle as described previously with reference to the apparatus of FIGS. 1 and 2.

FIG. 3 shows a differential dimension and position determining apparatus embodying the principles of my invention, useful more particularly in commercial applications where it is desirable to distinguish between a change in thickness of a travelling sheet or web and a change in the linearity of the web itself such as that produced by a wave or ripple. Such apparatus as exemplified in FIG. 3 comprises essentially a pair of devices described in FIG. 1 operating in series with one work-following nozzle indicating changes in position of one web surface and the other work-following nozzle indicating changes in position of the opposite surface of the web. The relative movements of the two nozzles may then be observed directly by means of a gage or used to actuate mechanism for appropriately compensating for the condition change.

Such differential method and apparatus of my invention as shown comprises substantially identical upper and lower follower sections supported by a suitable standard 57. Each section includes a gaging nozzle 58 mounted on one end of a horizontal frame member 59 having its other end vertically slidably engaged and guided at and by standard 57. The outlets of the two nozzles 58 are arranged opposite one another and in appropriate closely spaced relation to the respective opposite sides of a travelling web W. Each section has also a double-acting piston 60 slidable within a closed pneumatic cylinder 61 mounted on the standard 57. The pistons are each fixed on its elongated tubular piston rod 62 extending out the opposite ends of the corresponding cylinder 61 with that end of each rod 62 which is proximate to the nozzle level secured to the corresponding frame member 59. The opposite end of each piston rod 62 is fixedly connected to the shorter lateral leg of a generally L-shaped bracket 63, the longer leg of which is secured to the corresponding frame member 59.

An upstanding tubular gage support 64 is mounted on the herein upper bracket 63 so that the top of the upper rod 62 extends into the end of said support 64. A standard or other dial-type thickness gage 65 is adjustably seated in member 64 as by having its threaded neck portion 66 screwed into the open upper end of support 64. The depending push rod 67 of such gage 65 has a push rod extension 68 extending from within support 64 loosely down through the bores of piston rods 62 and to the lower end of bottom rod 62 where it rests on a plug 69 screwed into said lower end. Air at high pressure such as previously mentioned is supplied to nozzles 58 through hoses 70 and the back pressure is fed to the cylinder chambers proximate to the nozzles through hoses 71. Air is supplied also to the cylinder chambers distal to the nozzles through hoses 72 to balance the pistons and maintain the nozzle at the selected spacing from the work. Each section or gage unit of the FIG. 3 differential follower apparatus will be understood as in itself functioning in much the same way as in the apparatus of FIG. 1.

Still considering FIG. 3, it will be appreciated from the foregoing that movements of the upper gaging nozzle cause gage means 64, 65, 66 to shift bodily relative to its push rod rod 67, and that movements of the lower gaging nozzle cause said push rod, through the push rod extension 68, to shift relative to said gage means. Thus for example if web W presents a ripple, both nozzles would shift in the same direction and by the same amount, resulting in no relative movement between the gage 65 and its push rod 67 and no change in the dial indication. If on the other hand, the web decreased in thickness, one nozzle 58 would shift or both would shift in opposite directions causing the push rod 67 to move relative to the indicator or pointer, thereby changing the dial reading in correspondence with the thickness change.

The pressure booster and skid means of FIGS. 2 and 4 respectively are adapted also for incorporation in the FIG. 3 differential follower apparatus and provision is made also for supplying air under full line pressure to the cylinder 61 chambers adjacent the nozzles individually when it is desired to retract one or both of the nozzles from the work as described in connection with the apparatus of FIG. 1.

Apparatus embodying the principles of my invention may also be used to indicate or control the position of moving objects or work such as travelling sheets or webs. For such applications the gaging nozzle may be detached from the piston rod and mounted at a fixed location alongside the work to be controlled, and the piston stem or rod when used to actuate a gage or operate mechanism for correcting or compensating for the position change. Exemplary forms and arrangements of my devices and apparatus for such use applications are illustrated in FIGS. 5 to 7.

FIG. 5 shows an embodiment of my invention applied to control the lateral displacement of a travelling web W as on a feed roll or other rotary element. A stationary gaging nozzle 73 having a skid member 74 is positioned alongside such travelling web W. Changes in the displacement of the web produce corresponding changes in the back pressure at the nozzle which is transmitted to one of the dual chambers of a pneumatic cylinder 75 containing a piston 76 and whose other chamber is supplied with air, similarly for example as in FIG. 1, to balance the piston when the web is at the desired location on the feed roll or other means over which it is being advanced. The piston thus controlled by the gaging nozzle is operatively connected as schematically shown by the arrows and dotted lines of FIG. 5, to and so as to actuate mechanism as for changing the inclination of the feed rolls to bring the web back to its normal position and it may also be connected to a indicator for showing the web displacement.

FIG. 6 shows the like apparatus as for FIG. 5 but with the nozzle-responsive piston 76 in turn acting directly on the nozzle 73 for the purpose of limit control. The piston is able to shift to the right in FIG. 6 only until the back pressure at the nozzle, communicated to the right-hand cylinder chamber, exceeds the pressure of the air in the left-hand cylinder chamber whereupon piston movement and whatever action or function is governed thereby is stopped.

In FIG. 7 is shown the air-gaging device of preceding views incorporated in apparatus in accordance with the invention so as to afford a variable limit control. As therein illustrated by way of example a horizontal shaft M in bearings N and carrying rotatable cams or arms J, K, L is operatively interposed between piston 76 and skid means 74 so that the piston rod is aligned with the cams. The piston is free to travel to the right until it encounters cam J whereupon further movement to the right is stopped. If the cam J should now be rotated out of the way by some means (not shown), the piston is again free to travel to the right until it encounters cam K where it will again stop until cam K is pivoted out of the way, and so on.

It will be appreciated that my invention has many applications in the area of work control besides those specifically disclosed herein and it is intended that all matter contained in the above description or shown in the accompanying drawings shall be considered as illustrative and not in a limiting sense, the invention being pointed out in my following claims:

I claim:

1. Work dimension and position indicating apparatus comprising: a pneumatic cylinder containing intermediate its ends a piston defining two chambers therein, said piston having a stem extending out from an end of said cylinder; air gage means positionable operatively adjacent the work and mounted for movement with said piston stem, said air gage means including at least one gaging nozzle; means for supplying air under pressure to said nozzle; means for communicating work-responsive back pressure at said nozzle to one of said chambers; means for supplying to the other of said chambers air under pressure constantly proportioned to the air pressure supplied to said nozzle; means for operatively relating said piston to a nozzle position indicating gage; whereby said nozzle is bodily positionable at a determined distance from said work and dimensional and positional variations of the work relative to the nozzle are communicated to said piston and are adapted to be indicated at said gage; and means for supplying air under relatively greater pressure to the nozzle-communicating chamber for retracting said air gage means from the work.

2. Dimension and position indicating apparatus as defined in claim 1 together with an auxiliary skid element for work of low or indefinite back-pressure-producing capacity under direct air impingement: said skid element comprising; a leg member adapted to override such work; means relatively movably supporting said leg member on said air gage means of the apparatus so as to interpose the leg member between the work and the nozzle of said air gage means and in opposition to said nozzle for impingement of air therefrom onto the leg member; and said skid element including provision for biasing the leg member away from the nozzle and toward the work; whereby changes in back pressure at the nozzles are effected by the leg member in response to dimensional or positional variations of said work.

3. Dimension and position indicating apparatus as defined in claim 1 wherein the air gage means comprises first and second gaging nozzles and means is provided for supplying air under pressure to each of them, said air gage means further comprising a pressure-responsive booster element operatively between the nozzles and subject to work-reflected back pressure at the first nozzle and including a driven member effecting proportionate but substantial movements in response even to small back pressure changes at said first nozzle, said driven member disposed operatively opposite to and movable toward and away from the second nozzle for modifying the back pressure thereat to correspondingly augmented extents as compared to said back pressure changes at the first nozzle, and the means for communicating work-responsive back pressure to one of said chambers of the cylinder being in communication with said second nozzle, whereby the augmented pressure changes at said second nozzle are communicated to the piston of the cylinder and to the indicating gage.

4. Work dimension and position follower apparatus comprising: a fixed support; a pneumatic cylinder thereon containing intermediate its ends a piston defining two chambers therein, said piston having a stem projecting at one end of said cylinder; a nozzle connected to said stem, said nozzle being adapted to be positioned adjacent the work; means for supplying air under pressure to said nozzle; means for communicating work-controlled back pressure at said nozzle to the adjacent chamber of said cylinder; means for supplying to the other of said chambers air under pressure constantly proportioned to said air supplied to said nozzle whereby said nozzle is pneumatically floated at a determined distance from said work and dimensional and positional variations of said work relative to said nozzle are communicated to said piston causing corresponding compensating positional variations of said nozzle; and means for relatively markedly unbalancing the pressure in the two cylinder chambers at the will of the operator in a manner to cause retraction of the nozzle from the work.

5. Dimension and position follower apparatus as defined in claim 4 and a work following nozzle means positioned at the opposite side of said work and opposite said nozzle, said nozzle means being movable in response to positional variations of the side of said work facing said nozzle means, the relative movement of said nozzle and nozzle means then indicating the relative positional variations of said two sides of said work.

6. Work dimension and position indicating apparatus comprising a fixed support, a pneumatic cylinder thereon containing intermediate its ends a piston defining two chambers therein, said piston having a piston rod projecting at the opposite cylinder ends, a work-follower nozzle at an outer end of said piston rod, an air passage in said piston rod extending from adjacent the piston to said outer end, a nozzle position indicating gage operable by the other end of said piston rod, means for supplying air under pressure to the nozzle and for communicating work-reflected back pressure at the nozzle to the adjacent chamber of the cylinder, means for supplying to the other cylinder chamber air under pressure constantly proportioned to that supplied to said nozzle, whereby positional variations of the nozzle relative to work opposed thereto are communicated to the piston and indicated at said gage; and means for supplying air under relatively large pressure to said adjacent chamber for retracting said nozzle from said work.

7. Work dimension and position indicating apparatus comprising: a pair of air nozzles disposed opposite one another and adapted to be positioned respectively on opposite sides of work; a pair of stationary axially aligned pneumatic cylinders, one for each air nozzle and containing intermediate their ends a corresponding pair of double-acting pistons; tubular piston rods connected to said pistons and each extending exteriorly at each end of the respective cylinder; the adjacent exterior ends of said piston rods each having means thereon for carrying the corresponding air nozzle of the pair thereof; means for supplying air to said nozzles; means for communicating work-reflected back pressure at one of said nozzles to the corresponding one of said cylinders on one side of its said piston; means for communicating work-reflected back pressure at the other of said nozzles to the other of said cylinders on one side of its said piston; a nozzle position indicating gage carried with one piston and having an operating connection through said tubular piston rods to the other piston so as to be actuatable under movement of either and both of the pistons; and means for supplying air to said cylinders at the other sides of said pistons under pressure constantly proportioned to that supplied to said nozzles whereby only the relative positional variation of said sides of said work is indicated by said gage.

8. Work dimension and position indicating apparatus comprising a fixed support, a pneumatic cylinder thereon containing intermediate its ends a piston defining two chambers in said cylinder, said piston having a piston rod with outer ends projecting at the opposite cylinder ends, a work-follower nozzle at one outer end of said piston rod, an air passage in said piston rod communicating between said one outer end thereof and the interior of the adjacent cylinder chamber, an nozzle-position-indicating gage operable by the other outer end of said piston rod, means for supplying air under pressure directly to the nozzle and for communicating work-reflected back pressure at the nozzle to said piston-rod air passage and thereby to said adjacent cylinder chamber, means for supplying to the other cylinder chamber air under pressure constantly proportioned to that supplied to said nozzle, whereby positional variations of the nozzle relative to work opposed thereto are communicated to the piston and indicated at said gage, and means for supplying air under relatively higher pressure to said adjacent cylinder chamber for retracting the nozzle from the work.

References Cited by the Examiner

UNITED STATES PATENTS

| 2,438,696 | 3/48 | Fox et al. | 73—37.5 |
| 2,692,498 | 10/54 | Knobel | 73—37.5 |

FOREIGN PATENTS

| 1,084,711 | 7/54 | France. |
| 341,365 | 1/31 | Great Britain. |
| 128,332 | 5/50 | Sweden. |

ISAAC LISANN, *Primary Examiner.*